United States Patent Office 3,350,155
Patented Oct. 31, 1967

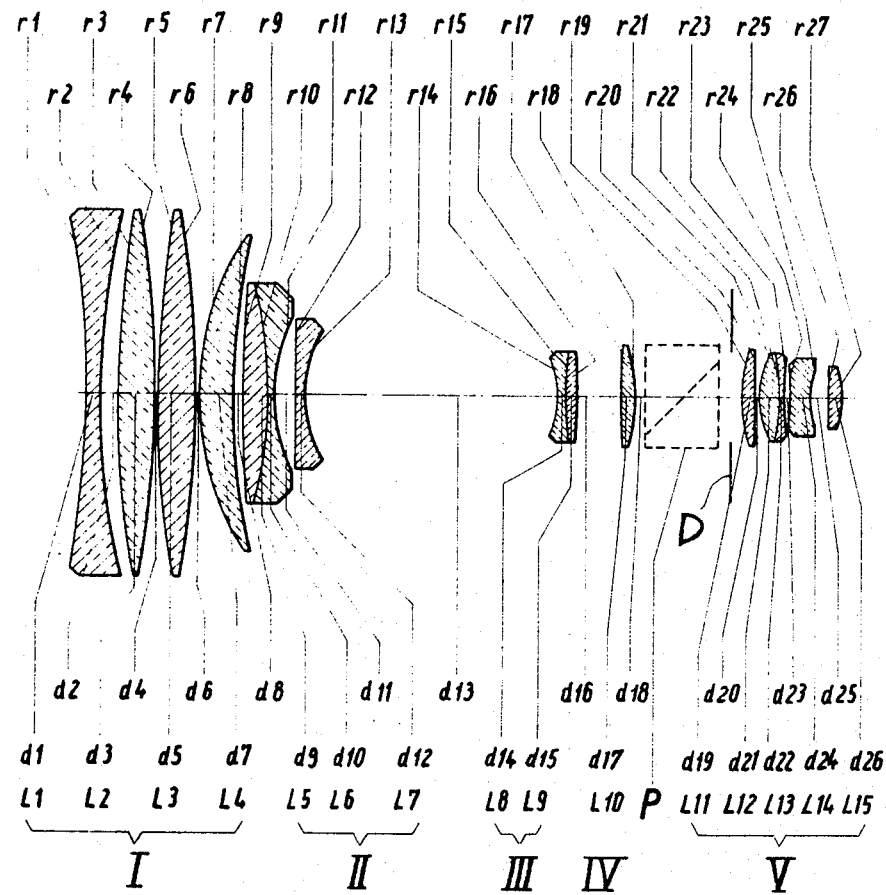

3,350,155
VARIFOCAL OBJECTIVE SYSTEM
Karl Heinrich Macher, Bad Kreuznach, Rhineland, Germany, assignor to Jos. Schneider & Co., Optische Werke, Bad Kreuznach, Rhineland, Germany
Filed Oct. 2, 1964, Ser. No. 401,128
Claims priority, application Germany, Oct. 16, 1963, Sch 34,003
2 Claims. (Cl. 350—176)

This is a continuation-in-part of my copending application Ser. No. 295,851, filed July 17, 1963, relating to a high-speed varifocal objective for photographic or cinematographic cameras.

A typical objective of this type, disclosed in commonly assigned copending application Ser. No. 126,306 filed by me jointly with Günter Klemt on July 24, 1961, and now abandoned, includes a fixed rear lens group and an adjustable forward lens group, the latter consisting of a positive first component, a negative second component, a negative third component and a positive fourth component. The first component is substantially fixed axially, though it (or its front lens) may be limitedly displaceable for focusing purposes as is well known per se; the second and third components are movable to vary the overall focal length of the system, the fourth component being again fixed.

The general object of my present improvement is to provide a system of this type whose varifocal ratio is substantially greater than those hitherto realizable with similar systems, i.e. equals approximately 1:10 with a relative aperture better than 1:2 (e.g. 1:1.8).

Another object of this invention is to provide an improved objective of this type whose minimum focal length is relatively short, e.g. equal to or less than the image diagonal, for the purpose of increasing the field angle, the system at the same time insuring full illumination of the image field even for small diaphragm stops and with close-range focusing.

It is also an object of my invention to provide an objective system which, while satisfying the aforestated desiderata, is of compact design and relatively short total axial length even when the space between the two lens groups is used to accommodate an auxiliary element, such as a prism for reflex viewfinding, in addition to the usual diaphragm.

I have found, in accordance with this invention, that the foregoing objects can be realized by a suitable dimensioning of the individual focal lengths $f_I$, $f_{II}$, $f_{III}$, $f_{IV}$ of the four components of the forward lens group and the individual focal length $f_V$ of the rear lens group or basic objective for which the adjustable forward lens group acts as a varifocal attachment, this relationship being $$Rf_V/f_{min} \geq 3S/f_V \quad (1)$$

where R is the ratio of $f_{max}:f_{min}$ ($f_{max}$ and $f_{min}$ being the maximum and the minimum overall focal lengths of the system), S being the sum of the absolute values of the individual focal lengths $f_I$ to $f_{IV}$. Thus, with $R=10$ this formula can also be written in the form $$f_V^2/f_{min} \geq 0.3S \quad (2)$$

Advantageously, as in the system of my copending application 295,851, the first component consists of a dispersive front lens preceding three air-spaced positive lenses, the second component being constituted by two air-spaced dispersive lens members whereas the third and fourth components consist of individual lens members. The rear lens group consists of four air-spaced members of which the first, second and fourth are positive whereas the third one is negative, the second positive lens member being preferably a doublet with a dispersive cemented surface whereas the first member of the second component and the sole member of the third component are preferentially designed as doublets with collective cemented surfaces. More particularly, these surfaces may be forwardly concave, forwardly convex and forwardly concave in the second, third and fifth components, respectively, for effective suppression of chromatic aberrations.

For the correction of spherical, comatic and other residual aberrations I have found it advantageous to maintain the following relationships, individually or preferably in combination, between the radii of curvatures of certain lens members:

(a) The radius of the concave rear face of the front lens should be at least equal to the radius of the convex front face of the third positive lens of the first component.

(b) The radius of the front face of the second dispersive lens member of the second component should have an absolute magnitude equal to at least 1.5 times the magnitude of the radius of the corresponding front face of the dispersive member immediately preceding it.

(c) The convex rear face and the concave front face of the sole member of the third component should have absolute magnitudes in a ratio of at least 4:1.

(d) The radius of the rear face of the first (positive) lens of the fifth component should equal, again in absolute terms, at least 10 times the radius of the convex rear face of the sole member of the fourth component.

The individual focal length $f_I$ of such a system, designed for a varifocal ratio R of about 10, may lie within $\pm 10\%$ of the maximum overall focal length $f_{max}$.

The sole figure of the accompanying drawing illustrates an embodiment of my present invention.

The system shown in the drawing comprises a four-component varifocal forward lens group I–IV and a fixed-focus four-component rear lens group V. The first component I of the varifocal group comprises a biconcave front lens $L_1$ with radii $r_1$, $r_2$ and thickness $d_1$, separated by an air space $d_2$ from an assembly of three closely juxtaposed collective singlets, i.e. a first biconvex lens $L_2$ with radii $r_3$, $r_4$ and thickness $d_3$, a second biconvex lens $L_3$ with radii $r_5$, $r_6$ and thickness $d_5$, and a positive meniscus $L_4$ with radii $r_7$, $r_8$ and thickness $d_7$; the intervening air spaces have been designated $d_4$ and $d_6$. A variable air space $d_8$ separates the positively refracting first component I from the axially shiftable, negatively refracting second component II which consists of a doublet, constituted by a biconvex lens $L_5$ (radii $r_9$, $r_{10}$, thickness $d_9$) cemented onto a biconvex lens $L_6$ (radii $r_{10}$, $r_{11}$, thickness $d_{10}$), and a nearly plano-concave lens $L_7$ (radii $r_{12}$, $r_{13}$, thickness $d_{12}$) separated from doublet $L_5$, $L_6$ by a distance $d_9$. Another variable air space $d_{13}$ intervenes between components II and III, the latter being an axially shiftable doublet consisting of a substantially plano-concave lens $L_8$ (radii $r_{14}$, $r_{15}$, thickness $d_{14}$) and a substantially plano-convex lens $L_9$ (radii $r_{15}$, $r_{16}$, thickness $d_{15}$) cemented thereto. The fourth component IV, following component III with a variable spacing $d_{16}$, is a fixed positive biconvex lens $L_{10}$ having radii $r_{17}$, $r_{18}$ and thickness $d_{17}$.

Component V follows the group I–IV with a spacing $d_{18}$ to accommodate a reflex prism P and a diaphragm D, the four members of this component being a substantially biconvex lens $L_{11}$ (radii $r_{19}$, $r_{20}$, thickness $d_{19}$), another positive lens member spaced from lens $L_{11}$ by an air gap $d_{20}$ and designed as a doublet composed of a biconvex lens $L_{12}$ (radii $r_{21}$, $r_{22}$, thickness $d_{21}$) and a biconcave lens $L_{14}$ (radii $r_{22}$, $r_{23}$, thickness $d_{22}$) cemented to it, a biconcave singlet $L_{14}$ (radii $r_{25}$, $r_{26}$, thickness $d_{25}$) separated from doublet $L_{12}$, $L_{13}$ by an air space $d_{23}$, and a biconvex singlet $L_{15}$ (radii $r_{26}$, $r_{27}$, thickness $d_{26}$) following the lens $L_{14}$ with a spacing $d_{25}$.

Representative numerical values for the radii $r_1$–$r_{27}$, the thicknesses and air spaces $d_1$–$d_{26}$, the refractive indices $n_d$ and the Abbé numbers $\nu$ of a system as shown in the drawing, constituting an objective with relative aperture of 1:1.8 and varifocal range of 30 to 300 linear units (e.g. millimeters), are given in the following table:

TABLE

| | Lens | Radii | Thicknesses and Separations | $n_d$ | $\nu$ |
|---|---|---|---|---|---|
| I | L$_1$ | $r_1 = -584.90$<br>$r_2 = +494.90$ | $d_1 = 9.00$<br>$d_2 = 9.00$ | 1.74080<br>Air space | 28.05 |
| | L$_2$ | $r_3 = +663.50$<br>$r_4 = -663.50$ | $d_3 = 24.75$<br>$d_4 = 0.50$ | 1.62041<br>Air space | 60.29 |
| | L$_3$ | $r_5 = +663.50$<br>$r_6 = -663.50$ | $d_5 = 24.75$<br>$d_6 = 0.50$ | 1.62041<br>Air space | 60.29 |
| | L$_4$ | $r_7 = +181.45$<br>$r_8 = +454.50$ | $d_7 = 23.50$<br>$d_8 = 145.10$ | 1.62299<br>Variable air space | 58.12 |
| II | L$_5$<br>L$_6$ | $r_9 = +750.40$<br>$r_{10} = -276.10$<br>$r_{11} = +107.80$ | $d_9 = 16.50$<br>$d_{10} = 4.75$<br>$d_{11} = 14.00$ | 1.80518<br>1.58913<br>Air space | 25.46<br>61.24 |
| | L$_7$ | $r_{12} = -1,266.50$<br>$r_{13} = +77.10$ | $d_{12} = 5.00$<br>$d_{13} = 18.95$ | 1.62041<br>Variable air space | 60.29 |
| III | L$_8$<br>L$_9$ | $r_{14} = -53.45$<br>$r_{15} = +235.60$<br>$r_{16} = -349.40$ | $d_{14} = 4.00$<br>$d_{15} = 7.25$<br>$d_{16} = 28.00$ | 1.62041<br>1.80518<br>Variable air space | 60.29<br>25.46 |
| IV | L$_{10}$ | $r_{17} = +371.65$<br>$r_{18} = -97.65$ | $d_{17} = 10.00$<br>$d_{18} = 50.00$ | 1.62041<br>Diaphragm space | 60.29 |
| V | L$_{11}$ | $r_{19} = +85.55$<br>$r_{20} = +3,937.50$ | $d_{19} = 10.00$<br>$d_{20} = 0.50$ | 1.58784<br>Air space | 68.19 |
| | L$_{12}$<br>L$_{13}$ | $r_{21} = +51.30$<br>$r_{22} = -191.05$<br>$r_{23} = +223.20$ | $d_{21} = 13.50$<br>$d_{22} = 3.50$<br>$d_{23} = 2.50$ | 1.71300<br>1.80518<br>Air space | 53.89<br>25.46 |
| | L$_{14}$ | $r_{24} = -253.20$<br>$r_{25} = +42.03$ | $d_{24} = 12.50$<br>$d_{25} = 11.25$ | 1.80518<br>Air space | 25.46 |
| | L$_{15}$ | $r_{26} = +229.85$<br>$r_{27} = -71.00$ | $d_{26} = 9.25$ | 1.71736 | 29.51 |
| | | | $d_{total} = 458.55$ | | |

The individual focal lengths of components I, II, III, IV and V as given in the foregoing table can be computed as follows:

$$f_I = +290.8$$
$$f_{II} = -80.1$$
$$f_{III} = -120.0$$
$$f_{IV} = +125.2$$
$$f_V = +97.5$$

It will be seen that these values satisfy the relationships (1) and (2) set forth above.

Furthermore, these values also satisfy the relationships $r_2/r_7 \geq 1$, $r_{12}/r_9 \geq 1.5$, $r_{16}/r_{14} \geq 4$ and $r_{20}/r_{18} \geq 10$ specified above as desirable for the correction of aberrations.

The magnitudes of the variable air spaces given in the table apply to an intermediate overall focal length of numerical value 150. For minimum focal length $f_{min} = 30$, the numerical value of these air spaces will be:

$$d_8 = 5.00$$
$$d_{13} = 159.20$$
$$d_{16} = 27.85$$

For the maximum focal length $f_{max} = 300$, these values will be:

$$d_8 = 176.55$$
$$d_{13} = 13.85$$
$$d_{16} = 1.55$$

If the system is miniaturized for use in an 8-mm. camera, the variation in focal length may correspond to a range of 6 to 60 mm.

From the specific values given above it will be noted that the ratio $f_V/f_{min}$ can be equated to approximately 3 so that inequality (2) can be rewritten in the following form:

$$0.1 \leq f_V/S \qquad (3)$$

A practical upper limit for $f_V/S$ is 0.3.

The several ratios of radii of curvature given above may have upper limits of infinity, except for the ratio $r_{16}/r_{14}$ whose upper practical limit is approximately 10.

I claim:

1. An optical objective system constituted by a fixed-focus rear lens group and a forward lens group consisting of a substantially fixed positive first component, an axially movable negative second component, an axially movable negative third component and a fixed positive fourth component, said first component consisting of three air-spaced positive lenses and a dispersive front lens preceding said lenses, said second component consisting of two air-spaced dispersive lens members, said third component consisting of a single dispersive lens member, said fourth component consisting of a single collective lens member, said second and third components being movable relatively to each other and to said first and fourth components into a first position wherein said system has a relatively short focal length, an intermediate position with an intermediate focal length and a third position with a relatively large focal length, the first dispersive lens member of said second component and the dispersive lens member constituting said third component are doublets with positively refractive cemented surfaces, said rear lens group consisting of a first positive singlet, a positive doublet with a negatively refractive cemented surface, a negative singlet and a second positive singlet following one another in the order named, the cemented surfaces of said first dispersive lens member, said third component and said positive doublet being respectively concave, convex and concave as seen from the object side of the system, the numerical values of the radii of curvature $r_1$ to $r_{27}$ of said dispersive front lens L$_1$, said three air-spaced positive lenses L$_2$, L$_3$, L$_4$, the first dispersive lens member L$_5$, L$_6$ and the second dispersive lens member L$_7$ of said second component, said third component L$_8$, L$_9$, said fourth component L$_{10}$, said first positive singlet L$_{11}$, said positive doublet L$_{12}$, L$_{13}$, said negative singlet L$_{14}$ and said second positive singlet L$_{15}$, and of the axial thicknesses and separations $d_1$ to $d_{26}$ thereof, based upon a numerical value of 150 for an intermediate overall focal length of the system at said intermediate position, the refractive indices $n_d$ of the lenses L$_1$ to L$_{15}$ and their Abbé numbers $\nu$ being substantially as given in the following table, wherein $d_8$, $d_{13}$ and $d_{16}$ are given for said intermediate position:

TABLE

| Lens | Radii | Thicknesses and Separations | $n_d$ | $\nu$ |
|---|---|---|---|---|
| L$_1$ | $r_1 = -584.90$<br>$r_2 = +494.90$ | $d_1 = 9.00$<br>$d_2 = 9.00$ | 1.74080<br>Air space | 28.05 |
| L$_2$ | $r_3 = +663.50$<br>$r_4 = -663.50$ | $d_3 = 24.75$<br>$d_4 = 0.50$ | 1.62041<br>Air space | 60.29 |
| L$_3$ | $r_5 = +663.50$<br>$r_6 = -663.50$ | $d_5 = 24.75$<br>$d_6 = 0.50$ | 1.62041<br>Air space | 60.29 |
| L$_4$ | $r_7 = +181.45$<br>$r_8 = +454.50$ | $d_7 = 23.50$<br>$d_8 = 145.10$ | 1.62299<br>Variable air space | 58.12 |
| L$_5$<br>L$_6$ | $r_9 = +750.40$<br>$r_{10} = -276.10$<br>$r_{11} = +107.80$ | $d_9 = 16.50$<br>$d_{10} = 4.75$<br>$d_{11} = 14.00$ | 1.80518<br>1.58913<br>Air space | 25.46<br>61.24 |

TABLE—Continued

| Lens | Radii | Thicknesses and Separations | $n_d$ | $\nu$ |
|---|---|---|---|---|
| $L_7$ | $r_{12}=-1,266.50$ | $d_{12}=5.00$ | 1.62041 | 60.29 |
|  | $r_{13}=+77.10$ | $d_{13}=18.95$ | Variable air space | |
| $L_8$ | $r_{14}=-53.45$ | $d_{14}=4.00$ | 1.62041 | 60.29 |
| $L_9$ | $r_{15}=+235.60$ | $d_{15}=7.25$ | 1.80518 | 25.46 |
|  | $r_{16}=-349.40$ | $d_{16}=28.00$ | Variable air space | |
| $L_{10}$ | $r_{17}=+371.65$ | $d_{17}=10.00$ | 1.62041 | 60.29 |
|  | $r_{18}=-97.65$ | $d_{18}=50.00$ | Diaphragm space | |
| $L_{11}$ | $r_{19}=+85.55$ | $d_{19}=10.00$ | 1.58784 | 68.19 |
|  | $r_{20}=+3,937.50$ | $d_{20}=0.50$ | Air space | |
| $L_{12}$ | $r_{21}=+51.30$ | $d_{21}=13.50$ | 1.71300 | 53.89 |
| $L_{13}$ | $r_{22}=-191.05$ | $d_{22}=3.50$ | 1.80518 | 25.46 |
|  | $r_{23}=+223.20$ | $d_{23}=2.50$ | Air space | |
| $L_{14}$ | $r_{24}=-253.20$ | $d_{24}=12.50$ | 1.80518 | 25.46 |
|  | $r_{25}=+42.03$ | $d_{25}=11.25$ | Air space | |
| $L_{15}$ | $r_{26}=+229.85$ | $d_{26}=9.25$ | 1.71736 | 29.51 |
|  | $r_{27}=-71.00$ | | | |

2. A system as defined in claim 1 wherein the spaces $d_8$, $d_{13}$ and $d_{16}$ have the following values in said first and third positions, respectively, corresponding to numerical values of the focal length of 30 and 300:

|  | $d_8$ | $d_{13}$ | $d_{16}$ |
|---|---|---|---|
| First position | 5.00 | 159.20 | 27.85 |
| Third position | 176.55 | 13.85 | 1.55 |

References Cited
UNITED STATES PATENTS
3,027,805  4/1962  Yamaji _____ 88—57

FOREIGN PATENTS
646,409  11/1950  Great Britain.

JEWELL H. PEDERSEN, *Primary Examiner.*
JOHN K. CORBIN, *Examiner.*
R. STERN, *Assistant Examiner.*